US009298925B1

(12) United States Patent
Crittall et al.

(10) Patent No.: US 9,298,925 B1
(45) Date of Patent: Mar. 29, 2016

(54) SUPPLY CHAIN CYBER SECURITY AUDITING SYSTEMS, METHODS AND COMPUTER PROGRAM PRODUCTS

(71) Applicant: CA, Inc., Islandia, NY (US)

(72) Inventors: Rob Crittall, Dorset (GB); Pierre Jacques Viljoen, Houten (NL); Luke Forsyth, Cambridge (GB)

(73) Assignee: CA, Inc., New York, NY (US)

( * ) Notice: Subject to any disclaimer, the term of this patent is extended or adjusted under 35 U.S.C. 154(b) by 325 days.

(21) Appl. No.: 13/791,741

(22) Filed: Mar. 8, 2013

(51) Int. Cl.
*G06F 9/00* (2006.01)
*G06F 21/57* (2013.01)

(52) U.S. Cl.
CPC .................................. *G06F 21/577* (2013.01)

(58) Field of Classification Search
USPC ...................................................... 726/22, 25
See application file for complete search history.

(56) References Cited

U.S. PATENT DOCUMENTS

| | | | | |
|---|---|---|---|---|
| 6,473,794 | B1 * | 10/2002 | Guheen ................... | H04L 41/22 709/223 |
| 6,557,054 | B2 * | 4/2003 | Reisman ................... | G06F 8/65 709/206 |
| 7,747,873 | B2 * | 6/2010 | Rabin ................. | G06F 9/44521 713/180 |
| 2007/0067847 | A1 * | 3/2007 | Wiemer .............. | H04L 63/1433 726/25 |
| 2007/0174467 | A1 * | 7/2007 | Ballou ................ | H04L 63/0838 709/227 |
| 2007/0180509 | A1 * | 8/2007 | Swartz .................. | G06F 9/4406 726/9 |
| 2007/0192863 | A1 * | 8/2007 | Kapoor ................... | G06F 9/505 726/23 |
| 2008/0040790 | A1 * | 2/2008 | Kuo ............................... | 726/12 |
| 2008/0047016 | A1 * | 2/2008 | Spoonamore .......... | G06Q 10/06 726/25 |
| 2011/0213869 | A1 * | 9/2011 | Korsunsky .............. | G06F 21/55 709/223 |
| 2011/0231361 | A1 * | 9/2011 | Patchava et al. .............. | 707/602 |
| 2012/0023554 | A1 * | 1/2012 | Murgia ................. | H04L 63/102 726/4 |
| 2013/0283336 | A1 * | 10/2013 | Macy .................... | G06F 21/577 726/1 |
| 2014/0013434 | A1 * | 1/2014 | Ranum ................. | H04L 63/145 726/24 |
| 2014/0173738 | A1 * | 6/2014 | Condry ................. | G06F 21/568 726/25 |

OTHER PUBLICATIONS

Computer Desktop Encyclopedia definition of "processor": http://lookup.computerlanguage.com/host_app/search?cid=C999999&term=processor&lookup.x=0&lookup.y=0.*
Bhilare, D.S.; Ramani, Dr. A.K.; Tanwani, Dr. Sanjay. Information Security Risk Assessment & Pointed Reporting: Scalable Approach. International Conference on Computer Engineering and Technology, 2009. vol. 1. Relevant pp. 365-370. http://ieeexplore.ieee.org/stamp/stamp.jsp?tp=&arnumber=4769490.*
Azuma, M.P.; Ahmad, Rabiah; Sahib, Shahrin; Shamsuddin, Solahuddin. A Propose Technical Security Metrics Model for SCADA Systems. 2012 International Conference on Cyber Security, Cyber Warfare and Digital Forensic (CyberSec). Relevant pp. 70-75. http://ieeexplore.ieee.org/stamp/stamp.jsp?tp=&arnumber=6246089.*
MacLeod, K.J., "Patch Management and the Need for Metrics", 2004, SANS Institute InfoSec Reading Room, SANS Security Essentials GSEC, Version 1.4b, 20 pages.
Huddleston, M., et al, "Cyber Ops Metrics, GB965 Quick Start Pack: Patch Management", Aug. 2012, Version 0.10, TM Forum, 28 pages.
CA Business Service Insight, Product Sheet 3S1382_0611, CA Technologies, 2011, 5 pages.

* cited by examiner

*Primary Examiner* — Jeremiah Avery
(74) *Attorney, Agent, or Firm* — Myers Bigel & Sibley, P.A.

(57) ABSTRACT

Software patch information is received from an entity. Supplier information is also received from the entity. The entity is directly or indirectly associated with a supply chain based upon the supplier information. A metric of cyber preparedness in the supply chain is identified based upon the software patch management information. The metric of cyber preparedness is communicated to a member of the supply chain (i.e., an entity in the supply chain). Related systems, methods and computer program products as described.

21 Claims, 8 Drawing Sheets

| General | Calculation | Custom Navigation | Composition |

☑ Custom Weights

| Name ◄► | Type ◄► | Weight ◄► | Path ◄► |
|---|---|---|---|
| ACME Elec Co. Supply Chain | Contract Party Group | 20 | Contract Party Group: ACME Elec Co. Supply Chain |
| ACME Diesel Co. Supply Chain | Contract Party Group | 5 | Contract Party Group: ACME Diesel Co. Supply Chain |
| AN Other Water Co. Supply Chain | Contract Party Group | 5 | Contract Party Group: AN Other Water Co. Supply Chain |
| ACME Gas Co. Supply Chain | Contract Party Group | 5 | Contract Party Group: ACME Gas Co. Supply Chain |
| ACME Bank Co. Supply Chain | Contract Party Group | 1 | Contract Party Group: ACME Bank Co. Supply Chain |
| ACME Insurance Co. Supply Chain | Contract Party Group | 1 | Contract Party Group: ACME Insurance Co. Supply Chain |
| ACME Networks Co. Supply Chain | Contract Party Group | 40 | Contract Party Group: ACME Networks Co. Supply Chain |
| ACME Computers Co. Supply Chain | Contract Party Group | 3 | Contract Party Group: ACME Computers Co. Supply Chain |
| ACME Telco Co. | Contract Party | 20 | Contract Party: ACME Telco Co. |

Save    Cancel

FIG. 7

SUPPLY CHAIN CYBER SECURITY AUDITING SYSTEMS, METHODS AND COMPUTER PROGRAM PRODUCTS

BACKGROUND

Various embodiments described herein relate to computer systems, methods and program products, and more particularly to computer security systems, methods and program products.

Modern day enterprises use large numbers of networked computer systems to manage and control various aspects of the enterprise. Moreover, with the advent of the World Wide Web and the Internet, computer systems may be linked among various enterprises. As such, computer security, often referred to as "cyber security", is becoming increasingly important. Cyber security relates to mechanisms by which computer-based equipment, information and services are protected from unintended or unauthorized access, change and/or destruction.

Cyber security may present unique challenges compared to physical security. For example, cyber security may present a unique challenge because of the speed and repeatable nature of cyber attacks. Moreover, cyber attacks can cause more damage at a much lower cost than physical attacks. A cyber attack can impact both an entity itself or some or all of its critical supply chain (i.e., the network of an entity's suppliers, those suppliers' suppliers, etc.). Moreover, the entry point of the attack may not be the target. Additionally, attacks concerned with theft, damage or corruption of information critical to uphold the supply chain integrity can have catastrophic effects, e.g. transportation of dangerous goods/hazardous waste.

BRIEF SUMMARY

Various embodiments described herein can provide supply chain cyber security auditing systems, methods and computer program products. For example, a method of operating a computer system according to various embodiments described herein can receive software patch information from an entity and can receive supplier information from the entity. The entity is directly or indirectly associated with a supply chain based upon the supplier information. A metric of cyber preparedness in the supply chain is identified based upon the software patch management information. The metric of cyber preparedness is communicated to a member of the supply chain (i.e., an entity in the supply chain).

In some embodiments, the software patch management information comprises a plurality of software patch-related key performance indicators. Moreover, the metric of cyber preparedness in the supply chain can comprise a deviation from a nominal value of the software patch-related key performance indicator. The deviation may be identified by comparing a software patch version of software at an entity with a current patch version for the software.

Various techniques may be used to communicate the metric of cyber preparedness to a member of the supply chain. For example, a graphic illustration of the supply chain may be communicated to the member, along with identifications of cyber preparedness of the entities in the supply chain. In other embodiments, a warning may be communicated to the member of the supply chain to indicate a lapse of cyber preparedness of an entity in the supply chain. Warnings and graphic illustrations may also be provided.

In other embodiments, the software patch management information that is received from an entity may be normalized to account for, for example, different hardware platforms that use the software. Moreover, supplier weightings may also be received from the entity, along with the supplier information from the entity. The metric of cyber preparedness in the supply chain may be based on the software patch management information and the supplier weightings so that, for example, critical suppliers are provided a higher weight than non-critical suppliers. Also, software patch management weightings may also be received from the member of the supply chain to account for, for example, software that is more critical to the member of the supply chain. The metric of cyber preparedness in the supply chain may be based upon the software patch management information and the software patch management weightings that are received from the member of the supply chain.

It will be understood that various embodiments have been described above in connection with cyber security methods. However, various other embodiments described herein can provide a cyber security auditing hub that can be used by a plurality of entities to allow auditing of the entities supply chains and identifying a degree of cyber preparedness in the entities supply chains. Analagous supply chain cyber security auditing computer program products may also be provided according to various embodiments described herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 5-7 illustrate displays that may be displayed at an entity by supply chain cyber security systems, methods and computer program products according to various embodiments described herein.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Figure 1:
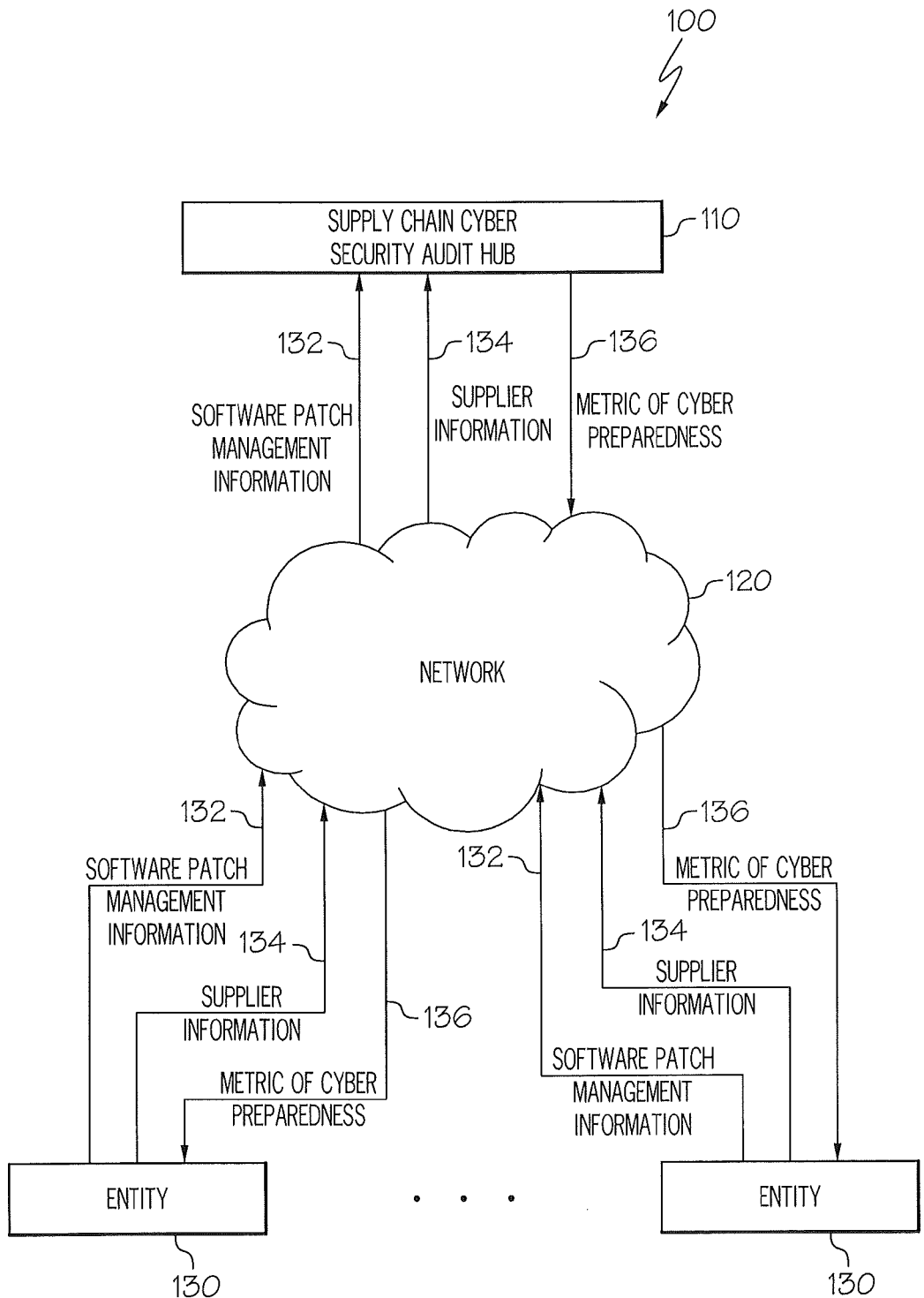
FIG. 1 is a block diagram of supply chain cyber security auditing systems, methods and computer program products according to various embodiments described herein.

FIG. 1 is a block diagram of supply chain cyber security auditing systems, methods and computer program products according to various embodiments herein. Referring to FIG. 1, the supply chain cyber security auditing systems, methods and computer program products 100 include a supply chain cyber security audit hub 110 that communicates with a plurality of entities 130 via a network 120. Each entity 130 may comprise a commercial or business enterprise or a government organization that includes at least one entity computer system that may be embodied in a standalone unit or may be contained as part of other computing infrastructure at the entity 130 such as a client-based server and/or cloud computing environment. The computer system for each entity 130 may be embodied as one or more enterprise, application, personal, pervasive and/or embedded computer systems at the entity 130 that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable medium.

Still referring to FIG. 1, the supply chain cyber security audit hub 110 may also be embodied in a standalone unit or may be contained as part of other computing infrastructure, such as a client-server and/or cloud computing environment. The supply chain cyber security audit hub 110 may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable medium. The supply chain cyber security audit hub 110 and the entities 130 may also include a network transceiver, processor, memory and/or other circuitry. The cyber chain cyber security audit hub 110 communicates with the entities 130 over a network 120 which may be embodied by any conventional, public and/or private, real and/or virtual, wired and/or wireless network including all or a portion of the global communications network known as the Internet, and may include various types of tangible, non-transitory computer readable medium.

Still referring to FIG. 1, a respective entity 130 provides software patch management information 132 to the supply chain cyber security audit hub 110, directly and/or via the network 120. As used herein a "software patch" is a piece of software designed to fix problems with, or update, a computer program or it's supporting data. This includes fixing security vulnerabilities and/or other bugs, and improving the usability and/or performance of the software and/or the hardware on which it is run. Software patch management information can include, for example, a list of hardware in the entity that runs software, a list of the software that runs on the hardware and a corresponding identification of the latest patch for the software that is installed on this hardware. The patch may be identified, for example, by a name, version number and date such as, "Windows 2010, Service Pack 3.2.4.3, Dec. 21, 2012". Other identification techniques and/or formats may be used.

Still referring to FIG. 1, a respective entity 130 is also configured to provide supplier information 134 to the supply chain cyber security audit hub 110, directly and/or via the network 120. The supplier information may identify other entities that supply products or services to the given entity 130. The entities may be identified by name, taxpayer ID number and/or other identifier for a business or government entity. Other identification techniques and/or formats may be used.

Still referring to FIG. 1, the supply chain cyber security audit hub 110 communicates a metric of cyber preparedness to one or more of the entities 130, directly and/or via the network 120, based on calculations that will be described below. The metric of cyber preparedness 130 may include a graphic illustration of an entity's supply chain along with identifications of cyber preparedness of the entities in the supply chain and/or a warning to a member of the supply chain to indicate a lapse of cyber preparedness of an entity in the supply chain. Detailed examples will be provided below. Other metrics of cyber preparedness may be used.

Transmission of the relevant supply chain and preparedness metric information as illustrated in FIG. 1 may need to be protected as well against transmission manipulation or interception, to ensure that vital supply chain information is not lost or compromised. Therefore, information delivery auditing may also be provided for some or all of the communications of FIG. 1. Metric communication and auditing in some instances may also be needed to uphold legislative or corporate/organizational regulations. For example, Enterprise Health and Safety (EHS) environmental hazard preparedness may have strict governmental reporting legislation on the topic of cyber attack reporting and information auditing.

Figure 2:
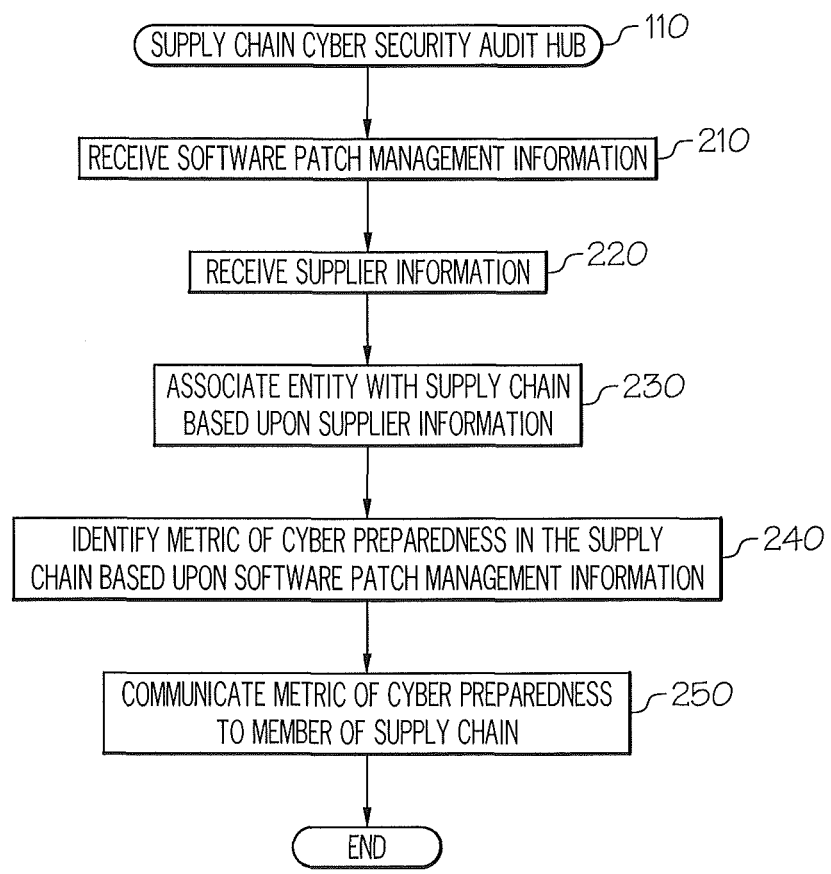
FIGS. 2-3 are flowcharts of operations that may be performed by supply chain cyber security systems, methods and computer program products according to various embodiments described herein.

FIG. 2 is a flowchart of operations that may be performed by a supply chain cyber security audit hub, such as the supply chain cyber security audit hub 110 of FIG. 1, according to various embodiments described herein. Referring now to FIG. 2, at Block 210, software patch management information, such as software patch management information 132, is received from an entity, such as a respective one of the entities 130 of FIG. 1. Referring to Block 220, supplier information, such as supplier information 134, is received from a respective one of the entities 130 of FIG. 1. It will be understood that the supplier information of Block 220 can include identification of all suppliers of an entity or only those suppliers that are deemed to be "critical" suppliers of the entity.

Referring now to Block 230, an entity is associated with a supply chain based upon the supplier information 134. As used herein, a "supply chain" is a set of "supplier" entities that supply goods and/or services to a "producer" entity so as to allow the producer entity to provide a product or service to its customers. A supply chain generally includes a multi-level web of nested entities, as a supplier entity for a given producer entity may also include its own supplier entities, and those supplier entities may include their own supplier entities. It has been estimated that four levels of nesting may be used to adequately manage a supply chain. Stated differently, for a given entity, it's suppliers, their suppliers, their suppliers and their suppliers may form a supply chain, for supply chain management. It will also be understood that operations of Block 230 may directly associate an entity with a named and/or numbered supply chain based on the entity's supplier information. In other embodiments, a direct association need not be made. Rather, the data set including a list of entities and a respective entity's direct suppliers can implicitly define a plurality of supply chains.

Still referring to FIG. 2, at Block 240 a metric of cyber preparedness in the supply chain is identified based upon the software patch management information. For example, as will be described in detail below, in some embodiments, the software patch management information may comprise a plurality of software patch-related Key Performance Indicators (KPIs) that may be supplied to the supply chain cyber security audit hub 110 as part of the software patch management information 132 and/or that may be derived by the supply chain cyber security audit hub 110 based on raw software patch management information. A metric of cyber preparedness may be an identification of a deviation from a nominal value of a software patch-related KPI.

Finally, at Block 250, the metric of cyber preparedness is communicated to a member of the supply chain, i.e., to one or more of the entities 130 that are members of a supply chain to which the metric of cyber preparedness applies. In some embodiments, a graphic illustration of the supply chain is communicated to the member of the supply chain, along with identifications of cyber preparedness of at least one of the entities in the supply chain. In other embodiments, a warning is communicated to the member of the supply chain to indicate a lapse of cyber preparedness of an entity in the supply chain. Various detailed examples will be provided below.

Figure 3:
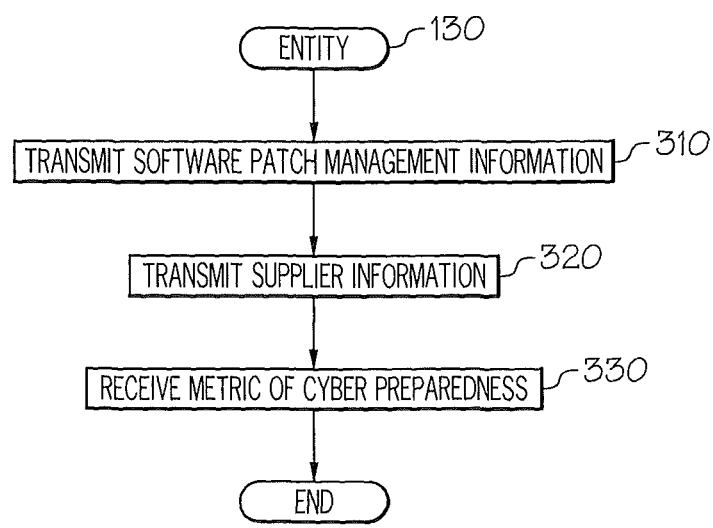

FIG. 3 is a flowchart of operations that may be performed by an entity, such as an entity 130 of FIG. 1, according to various embodiments described herein. Referring to FIG. 3, at Block 310, software patch management information, such as software patch management information 132 of FIG. 1, is transmitted by the entity 130 in the form of raw software patch management data, KPI data and/or other data. At Block 320, supplier information such as supplier information 134 of FIG. 1, is transmitted. As was described above, the supplier information may identify all direct suppliers of the entity or may only identify critical direct suppliers of the entity. Finally, at Block 330 the entity 130 receives a metric of cyber preparedness, such as a metric of cyber preparedness 136 of FIG. 3, when the entity 130 is a member of a supply chain that is associated with the metric of cyber preparedness.

Additional discussion of various embodiments of FIGS. 1-3 will now be provided.

Specifically, supply chain management is increasingly being used to efficiently provide goods and/or services to end customers in a supply chain. However, cyber defense presents a unique challenge to supply chain management because of the speed and repeatable nature of cyber attacks. Moreover, cyber attacks can cause damage at a much lower cost than physical terrorism and conventional warfare. A cyber attack can be directed against the entity itself and/or some or all of its critical supply chain. Moreover, the elements of an organization's critical supply chain may be relatively easy to identify.

Cyber security hubs have been discussed as a technique for allowing an entity to share known cyber threats with other entities. These techniques may not be successful, however, because an entity may not wish to share its cyber vulnerabilities with its customers and/or with its competitors. Moreover, it may be difficult for a given entity to access its own cyber security due to the large number of nested suppliers that are involved. In particular, a global business enterprise may have sixteen critical suppliers. It also has been estimated that four levels of nesting may be needed for supply chain security management (i.e., suppliers, their suppliers, their suppliers and their suppliers). Assume that six cyber security metrics will be tracked. Thus, a total of $16^4 \times 6$ or 393,216 metrics will need to be tracked. There would also be massive duplication in this list of data sets because, for example, a global enterprise may use a fuel company, a telecommunications provider and a software provider, but all of these entities may use the same water company. Additionally, the same supplier of service could offer varying degrees of service levels to the various parties in the supply chain.

In sharp contrast, various embodiments described herein can allow a supply chain cyber security audit hub to receive cyber security information from a plurality of entities, to receive supplier information from the plurality of entities, to associate a respective entity with a supply chain based on the supplier information and to identify a metric of cyber preparedness in the supply chain based upon the cyber security information. The metric of cyber preparedness can then be communicated to members of the supply chain as appropriate. Thus, a given entity need not send it's information to its suppliers or competitors. Moreover, only information for the entity and it's direct suppliers need be collected and transmitted. The supply chain cyber security audit hub can identify the various supply chains based on the supplier information that is supplied by the plurality of entities. A given entity therefore does not need to send duplicate information. Massive distribution of secure data may also be reduced or eliminated.

Accordingly, various embodiments described herein can allow an entity to share proof of preparedness for cyber defense without the complications and inefficiencies that are inherent in a nested supply chain. Rather, a supply chain cyber security audit can be established to independently verify the cyber preparedness of organizations and provide assurance at an acceptable level of effort. Entities would then be able to operate with a level of assurance that their supply chain was cyber secure. These efficiencies may only be achieved using a hosted hub due to the exponential and duplicated nature of nested supply chain assurance.

Various embodiments described herein may also arise from a recognition that software patch management information may be an accurate and leading indicator of an entity's cyber preparedness. Accordingly, software patch management information is provided and analyzed to audit cyber preparedness of a supply chain, according to various embodiments described herein. Other metrics may also be used in other embodiments as will be described below.

The software patch management information that is communicated by entities and analyzed by the supply chain cyber security audit hub may include an identification of a current patch, for example, by identifying the patch name, patch release number and patch date, for each software program that runs on each piece of hardware in the entity. The current patch identifications may then be compared to a list of current patches that are provided by software manufacturers so as to obtain indications of out-of-compliance patches. Unfortunately, however, a large entity may have tens of thousands or more of hardware devices each of which may run one or more software programs. Moreover, patch updating may occur with a high frequency, especially at times of cyber attacks. Accordingly, the correct patch identifications may be voluminous. Various embodiments described herein may use operational metrics for cyber defense in addition to, or instead of, individual current patch information, in order to determine cyber preparedness. Specifically, patch-related Key Performance Indicators (KPIs) may be used as software patch management information. In other embodiments, individual supply chain components may contain a patch management strategy that inherently puts the overall supply chain at risk. This patch management strategy may also be highlighted in a supply chain view.

More specifically, the Telecommunications Management Forum has listed the KPIs in the following Table as critical operational metrics for cyber defense:

TABLE

| ID | Business Unit | KPIs |
| --- | --- | --- |
| 1 | Configuration Management | Time to apply patches/time unpatched |
| 2 | Configuration Management | Completeness of patching across devices |
| 3 | Security | Criticality of deviation from patching standards |
| 4 | Security | Audited degree of systems susceptibility |
| 5 | Security | After-patch vulnerabilities |
| 6 | Architecture | Number of patches needed |

This list is derived from MacLeod, K. J., "Patch Management and the Need for Metrics", 2004, SANS Security Essentials GSEC, the disclosure of which is hereby incorporated herein by reference in its entirety. Moreover, the "TM Forum Guide to Patch Management", as described in Huddleston, M., et al, "Cyber Ops Metrics, GB965 Quick Start Pack: Patch Management", August 2012, TM Forum, has just been endorsed by the UK Cabinet Office. The six patch-related KPIs in the above Table may provide accurate and leading indicators of cyber preparedness. Moreover, many business entities include an internal patch management system that is used to update and manage patches in the entity. These patch management systems may derive the KPIs of the Table for internal use by the entity. The entity may also transmit these KPIs to the supply chain cyber security hub 110 as part of the software patch management information. Other KPIs may also be provided that are unrelated to patches. However, the patch-related information, such as the six KPIs in the Table, may provide a strong leading indicator of the most important areas of compliance.

Referring to the above Table, KPI 1 is a metric of a time to apply patches and/or a time unpatched. This metric may be identified for each software program or individual piece of hardware and/or may be reported using averages, highs/lows, standard deviations and/or other statistical data related to this KPI. KPI 2 provides an indication of how effective an entity is in ensuring that all patches are performed across all devices. KPI 3 provides a metric of how much an entity deviates from patching. Specifically, some hardware may not need to be patched with a given patch because the patch does not relate to the functioning of the particular piece of hardware even though the particular software is running on that hardware. KPI 4 provides a metric of how many notoriously vulnerable software programs are present in the entity. For example, "freeware" may be more susceptible to cyber attacks, so that they may be measured using KPI 4. KPI 5 provides a metric of how vulnerable the software and/or hardware is even after a patch has been installed. Thus, KPI 5 provides a metric of the vulnerabilities even after all current patching is implemented. Finally KPI 6 provides a metric of how often a device needs to be patched.

Accordingly, KPIs 1-6 that are described in the Table can provide a basis for the metrics of cyber preparedness. In general, KPIs 1-3 provide a metric of what is patched, whereas KPIs 4-6 provide metrics of what is not patched. These metrics are heavily automatable. Many entities will obtain these KPIs internally. According to various embodiments described herein, these KPIs may also be transmitted to a supply chain cyber security or the hub 110. It will also be understood that the "Business Unit" column of the Table indicates the business function that may generate the KPI in a large enterprise.

Additional discussion of FIGS. 2 and 3 will now be provided, assuming that the software patch management information comprises the six KPIs that were illustrated in the Table. Referring again to FIGS. 2 and 3, the software patch management information may be collected for transmission at Block 310 through the use of agents that are installed at the entity, scripts that are provided at the entity, file transfer routines that are set up at the entity and/or other conventional data collection schemes that can be set up at the entity. In some embodiments, the data may be normalized using, for example, Applications Control Engine (ACE) techniques for routers, so as to normalize the data that is received from different types of electronic devices that provide the same functionality. Thus, the software patch management information can be normalized to become agnostic of the source system.

The software patch management information 132 and supplier information 134 may be captured and processed at the supply chain cyber security audit hub 110 using a database management system such as Oracle or Microsoft SQL. One potentially useful system includes software marketed by CA Technologies under the designator, "CA Business Service Insight (BSI)", which may be used to track and improve the performance of services and service level agreements that are being used by an entity. CA Business Service Insight is described for example, in the Product Sheet 351382_0611 entitled, "CA Business Service Insight, 2011", the disclosure of which is hereby incorporated herein by reference.

As described in this Product Sheet, BSI can provide comprehensive service design and discovery, service performance management, service comparison management, sourcing studies and contractual service level management. BSI may be modified to receive software patch management information (Block 210), to receive supplier information (Block 220), to associate an entity with a supply chain based upon the supplier information (Block 230), to identify a metric of cyber preparedness in the supply chain based upon the software patch management information (Block 240) and to communicate the metric of cyber preparedness to a member of the supply chain (Block 250).

More specifically, in BSI, each company may be defined as a "Contract Party", and their six KPIs may be collected. Moreover, once the supplier information is received, a supply chain may be explicitly identified as a "Contract Party Group" or implicitly defined by the supplier relationships. Accordingly, BSI or other contract expectation tools may be used as a host to provide a supply chain cyber security audit hub according to various embodiments described herein. Any other software that can be used to capture data on an entity level, create associations among the entities, process the data against pre-defined standards and graphically view the processed data may also be used according to various embodiments described herein.

Figure 4:
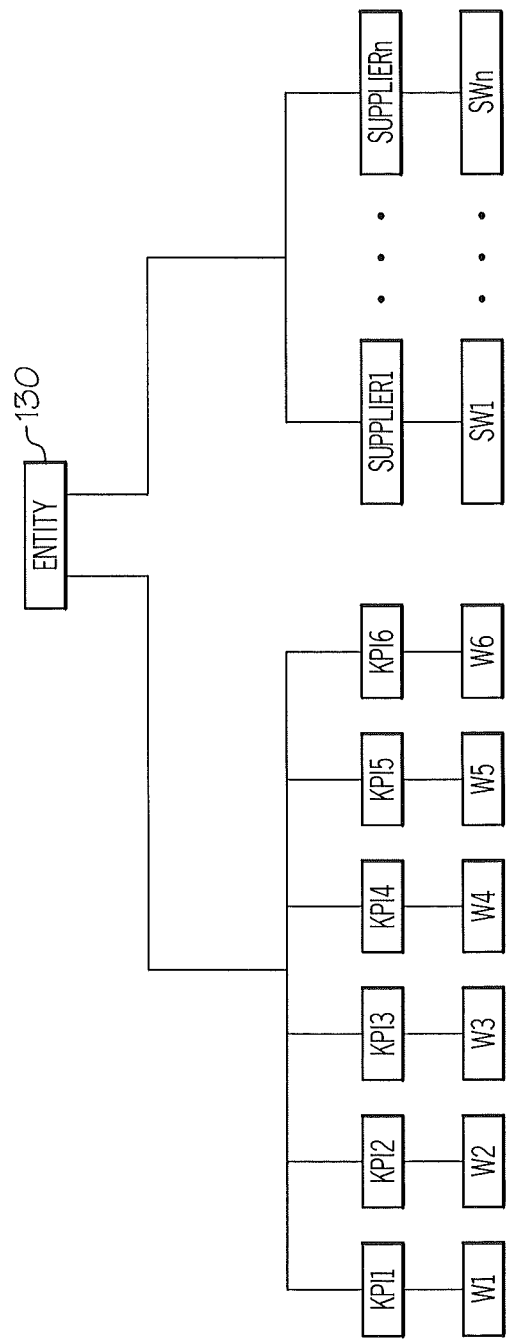
FIG. 4 is a block diagram of key performance indicators and related weighting information that can be used by supply chain cyber security systems, methods and computer program products according to various embodiments described herein.

FIG. 4 is a block diagram of a data representation of data for a given entity that may be stored at the supply chain cyber security audit hub 110. FIG. 4 illustrates the storage of the six KPIs 1-6 that are associated with an entity 130. Moreover, as illustrated in FIG. 4, each KPI may be provided with a weight, W1-W6, if a particular entity ascribes a greater weight to certain KPIs than other KPIs. The KPIs may be evaluated to access a metric of cyber preparedness for each of the KPIs for the entity 130. The weights W1-W6 may be used in accessing the impact of the given KPI's metric of cyber preparedness in a supply chain in which the entity 130 is a member. Accordingly, various embodiments described herein can obtain software patch management weightings from a member of the supply chain, and the metric of cyber preparedness in the supply chain may be based upon the software patch management information and the software patch management weightings.

Still referring to FIG. 4, for a given entity 130, a listing of its suppliers or key suppliers (Supplier 1-Supplier n) is also provided. Moreover, a supplier weight SW1-SWn also is provided to indicate that entity's weighting of the importance of that supplier to the entity. Thus, the supplier information that is received from the entity can also include supplier weightings, and the software patch management information (such as the KPIs) and the supplier weightings may be used to identify the metric of system preparedness in the supply chain.

Accordingly, as illustrated in FIG. 4, data need only be supplied and stored once regardless of how many supply chains depend on a given entity. Moreover, the nesting of supply chains may be created automatically by the entity-supplier relationships of FIG. 4 and need not be explicitly defined, or re-defined as these relationships change.

Referring again to FIG. 2, the supply chain cyber security audit hub 110 identifies the metric of cyber preparedness in the supply chain based upon the software patch management information at Block 240. These metrics of cyber preparedness may be graphically illustrated, for example, using the graphics capabilities of BSI and/or another graphics program that can graph relationships of data in a database. As shown at Block 250, the graphical illustration may be communicated to a member of the supply chain (i.e., to one of the entities that is impacted by the metric of cyber preparedness). The communication may take place by sending graphic illustrations to the member of the supply chain and/or by sending a warning message to the member of the supply chain. The warning message may be a text message, email, telephone and/or other message that may indicate the supplier and/or metric that is out of compliance. Alternatively, the message may simply alert the member of the supply chain to log on to the supply chain cyber security audit hub to view the data. Metric violation reporting may depend on the legal aspect or supply chain reporting requirement. For EHS there may be, for example, strict reporting regulations governed by local authority.

Figure 5:
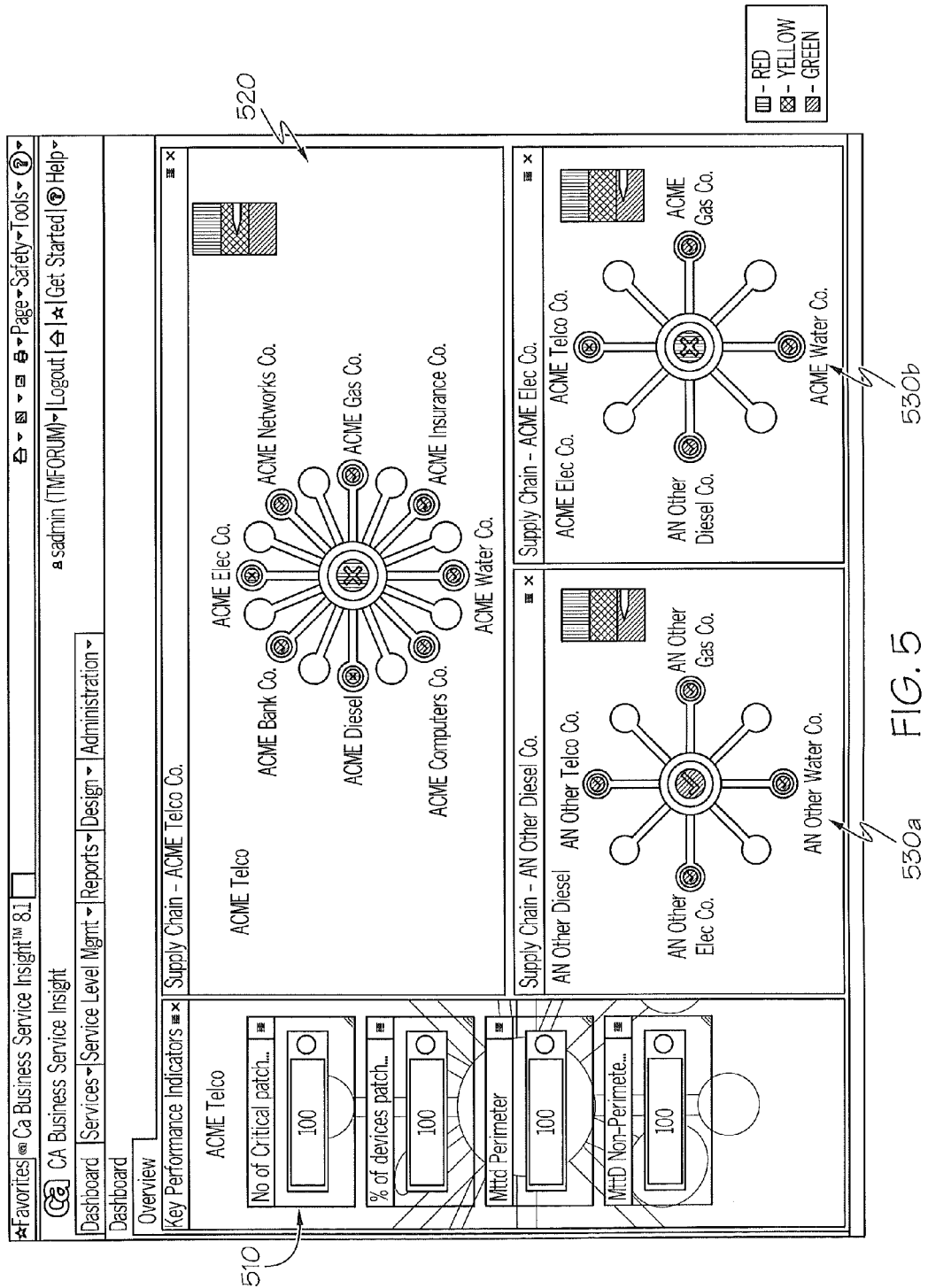

FIG. 5 illustrates a display of a graphical representation of cyber preparedness in the supply chain of an entity referred to as "Acme Telco". As shown in FIG. 5, Acme Telco has sixteen critical suppliers: Acme Fuels, Acme Electrical, Acme Operational Software Systems (OSS), Acme Business Software Systems (BSS), Acme Networks, Acme Trunk, Acme Computers, Acme Systems Integration (SI), Acme Consultants, Acme Information, Acme Help, Acme Investments, Acme Bank and Acme Insurance. It will be understood that the generic name "Acme" is used as an identifier throughout FIG. 5, but that Acme Telco and each of its sixteen suppliers are different entities.

Still referring to FIG. 5, the sidebar 510 shows KPI compliance of the current entity (Acme Telco) by illustrating the number of critical patches, the percentage of devices patched, the MTTD perimeter and the MTTD non-perimeter. The KPI are themselves not fixed, and what is considered to be the key indicators may change as a result of changes in technology and/or the discovery of new threats and vulnerabilities. Note, the data for this particular sidebar 510 indicates that Acme Telco's own KPIs are perfect. Yet, as will be described below, Acme Telco may have cyber security risk due to its nested supply chain.

The supply chain view 520 of FIG. 5 illustrates the current user's (Acme Telco) supply chain. Any number of suppliers can be shown in this view. However, to aid the readability, normally only high risk or special interest suppliers will be shown in this view. Sixteen suppliers are illustrated.

It will be understood that in FIG. 5, different colors may be used to indicate different levels of compliance. In the black and white drawings of this figure, different shadings are used to indicate different colors as shown in the legend of the figure. In other embodiments, however, different colors, sizes, intensities or other differentiators that are commonly used on user displays, may be used to indicate different amounts of compliance.

It will be understood that the various thresholds for compliance may be defined by default thresholds for a given KPI. For example, for KPI 1 described above, a threshold of less than 24 hours may be viewed as compliant (green). A threshold between 24-48 hours may be viewed as worrisome (yellow) and a threshold over 48 hours may be viewed as non-compliant (red). An entity can change these default thresholds based on its sensitivities. Warnings may be generated if a given threshold is exceeded.

As shown in the supply chain view of Block 520, Acme Telco's compliance level is red indicating a low level of compliance, even though Acme Telco itself has complied perfectly with its own KPIs as shown at the sidebar 510. Specifically, it can be seen that high risk is being caused by Acme Electric Company and Acme Diesel Company.

Additional supply chain views are illustrated in the regions 530a and 530b. The Acme Diesel supply chain is shown in region 530a. As shown, Acme Diesel's supply chain is in compliance. Acme Electric is shown in region 530b. However, in region 530b shown, Acme Electric is out of compliance due to its supplier Acme Telco being out of compliance. Accordingly, regions 530a and 530b illustrate how nesting of supply chains can create non-compliance. Moreover, in region 530b Acme Telco is shown as a supplier of Acme Electric, but Acme Electric is also shown as a supplier of Acme Telco. Thus, they can be mutual suppliers and if neither corrects the underlying fault, for example patch management, then each can permanently force the other out of compliance. They must correct the underlaying fault.

It will be understood that FIG. 5 illustrates a dashboard view of the supply chain. However, other graphical techniques may be used to illustrate the supply chain and levels of compliance. Moreover, there is no requirement for there to be any relationship between the views placed in the main dashboard. This area may be completely customisable and can hold 1-N views of which all, some or none, can be interrelated. The example of FIG. 5 displays only three. It should also be understood that the number of spokes displayed can also be customised. For example, the supply chain of ACME Telco, ACME Elec Co and AN Other Diesel Co. could, and in all probability would, contain more spokes in their supply chain than those displayed. While these will be included in the calculation of the overall health of the supply chain, the user may normally choose to display only the most heavily weighted, and therefore most important spokes in the display for the sake of readability.

Figure 6:
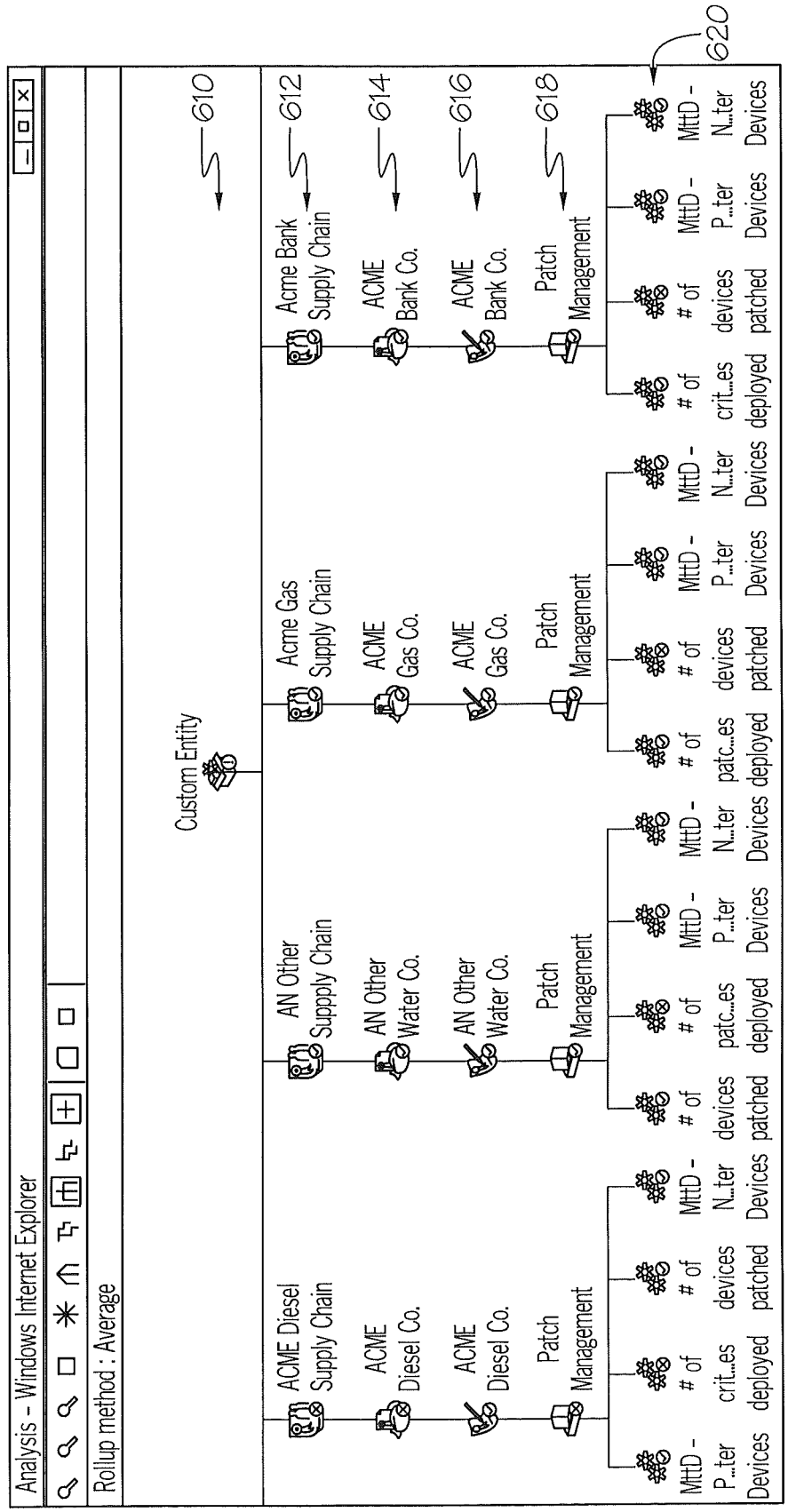

FIG. 6 illustrates a relationship view of the compliance of the elements in the supply chain for Acme Telco. This view can show how non-compliance of a supplier, or of a supplier's supplier, etc., bubbles up to non-compliance of a given entity. In FIG. 5, for ease of display, only four KPIs are shown. The top row 610 of FIG. 6 illustrates the entity being studied (Acme Telco). The rows below the top row 610 illustrates four supply chains for four suppliers to Acme Telco, listed in row 612. Two suppliers of each supplier are illustrated in rows 614 and 616. The bottom row 620 illustrates four KPIs of these suppliers. Thus, the entire supply chain down to four (4) levels and its KPIs may be represented graphically in a single drawing.

Thus, FIG. 6 provides a drill down to the individual KPI level of all the entities that go to make up the worst case calculation of a supply chain displayed on the dashboard view of FIG. 5. This view may be reached by clicking on the worst case indicator on the hub of a supply chain. In this context the top level "Custom Entity" refers to the hub clicked to launch the drill down. In this case it displays a drill down of ACME Telco.

In some embodiments, in this drill down all spokes in the chain will be included, not just those that the user has chosen to display on the dash board view. This is why ACME Bank appears in this drill down view but not the dash board view (because the user decided not to display it in the hub and spoke dash board view). This view scrolls left to right to see all spokes. Utilising this detail can reveal the reason why ACME Gas has rolled up to a worst case "fail" as a spoke of ACME Telco. It can be seen that the root cause for this was a failure of the # of Devices patched KPI.

There is no fixed number of layers of nesting nor is there a set number of key suppliers for any entity at any stage. One entity could deem it has 5 critical suppliers and another 50. If each of the entities with 5 critical suppliers found that each of those suppliers believed they had 50 critical suppliers, then the second layer of nesting would potentially have 250 suppliers, ignoring duplicates, even though the first tier only had 5. Each entity may decide for itself how many critical suppliers it has. The Diesel company may genuinely only have 5, but the grocery company may genuinely have 100. Moreover, critical suppliers may be determined internally by an entity or could be a legislative requirement.

As shown in FIG. 6, the supply chain for a given entity and the KPIs in the supply chain may be constructed even though the entity only supplied its own KPIs and an identification of its direct suppliers. Thus, the nested relationships may be inferred from the supplier information 134 that is provided by a given entity.

FIG. 7 graphically illustrates how a given entity can apply custom weights to its suppliers, as was described generally above. Specifically, a given entity may have different weightings for different suppliers depending upon the importance of that supplier to the entity. Thus, the custom weights of FIG. 7 allow additional significance to be applied to specified suppliers in an entity's supply chain. During the average percentage compliance calculation of a supply chain, additional weight can be added to suppliers if the failure of that link is viewed as especially significant.

Other weightings may also be used. For example, although many key indicators can be identified in a supply chain, the importance or ranking/rating these risks relative to the threat level posed may also be used in determining the overall weighted risk on the supply chain through a specific indicator.

Accordingly, various embodiments described herein can use database technology, and in some embodiments business service insight software, to allow the registration of any company and collecting their patch management data and then associating the company to any supply chain to which it is a member. Various embodiments can provide cyber preparedness audits that are comparable to the process of an independent financial audit to demonstrate financial health.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Figure 8:
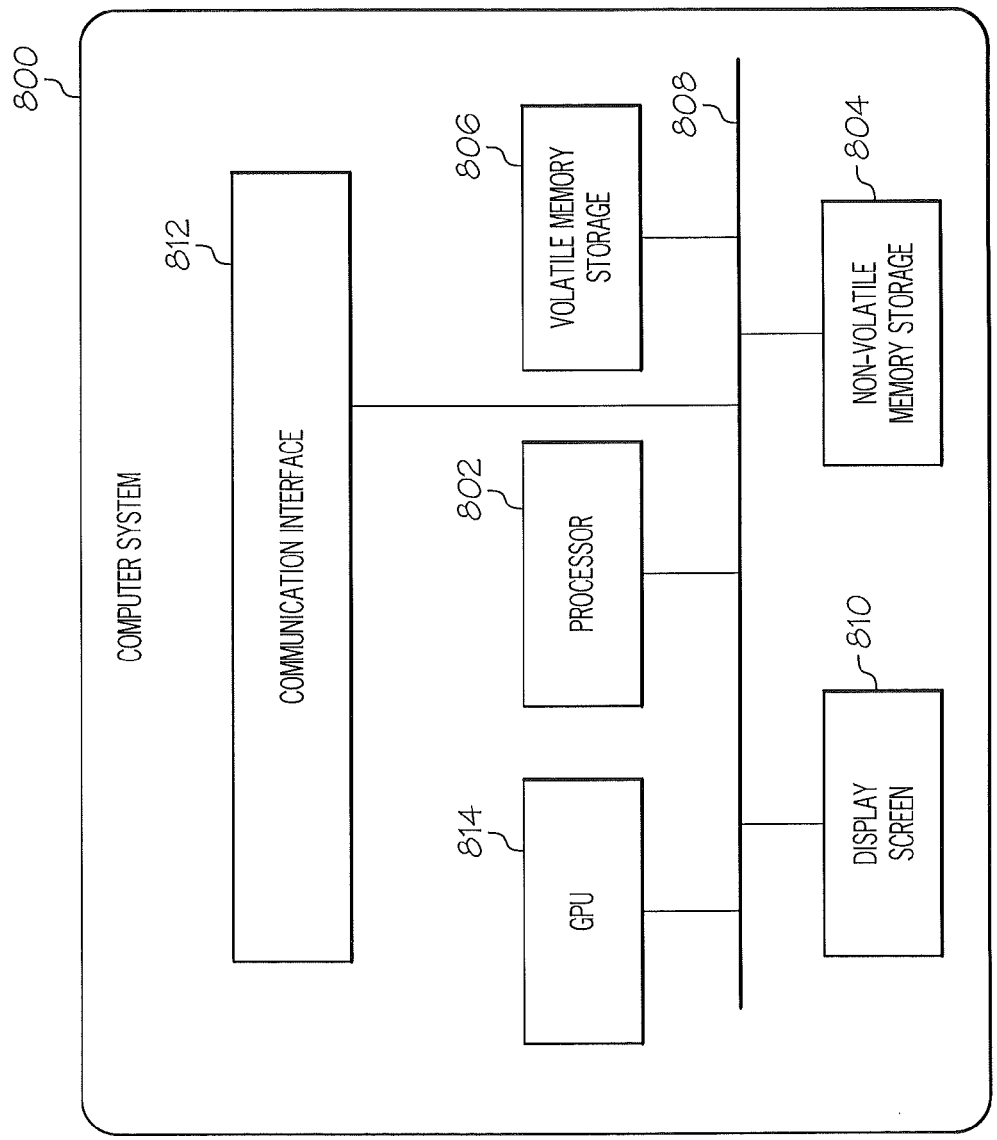
FIG. 8 is a block diagram of a computer system in which various embodiments described herein can be embodied.

FIG. 8 is an example computer system 800 in which various embodiments described herein may be implemented as computer-readable code. For example, the components of the supply chain cyber security audit hub 110 and/or one or more of the entities 130 may be implemented in one or more computer devices 800 using hardware, software implemented with hardware, firmware, tangible computer-readable storage media having instructions stored thereon, or a combination thereof and may be implemented in one or more computer systems or other processing systems. Components and methods in FIGS. 2-3 may be embodied in any combination of hardware and software.

Computing device 800 may include one or more processors 802, one or more non-volatile storage mediums 804, one or more memory devices 806, a communication infrastructure 808, a display screen 810 and a communication interface 812. Computing device 800 may also have networking or communication controllers, input devices (keyboard, a mouse, touch screen, etc.) and output devices (printer or display).

Processor(s) 802 are configured to execute computer program code from memory devices 804 or 806 to perform at least some of the operations and methods described herein, and may be any conventional or special purpose processor, including, but not limited to, digital signal processor (DSP), field programmable gate array (FPGA), application specific integrated circuit (ASIC), and multi-core processors. GPU 814 is a specialized processor that executes instructions and programs, selected for complex graphics and mathematical operations, in parallel.

Non-volatile storage 804 may include one or more of a hard disk drive, flash memory, and like devices that may store computer program instructions and data on computer-readable media. One or more of non-volatile storage device 804 may be a removable storage device. Memory devices 806 may include one or more volatile memory devices such as but not limited to, random access memory. Communication infrastructure 808 may include one or more device interconnection buses such as Ethernet, Peripheral Component Interconnect (PCI), and the like. Typically, computer instructions are executed using one or more processors 802 and can be stored in non-volatile storage medium 804 or memory devices 806.

Display screen 810 allows results of the computer operations to be displayed to a user or an application developer. Communication interface 812 allows software and data to be transferred between computer system 800 and external devices. Communication interface 812 may include a modem, a network interface (such as an Ethernet card), a communications port, a PCMCIA slot and card, or the like. Software and data transferred via communication interface 812 may be in the form of signals, which may be electronic, electromagnetic, optical, or other signals capable of being received by communication interface 812. These signals may be provided to communication interface 812 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

The invention claimed is:

1. A method of operating a computer system comprising:
receiving, at the computer system over a computer network, a network transmission comprising first software patch management information for computer systems of a first entity from the first entity, wherein the first entity comprises a first commercial enterprise or government organization;
receiving, over the computer network at the computer system, a network transmission comprising first supplier information and first supplier weightings from the first entity, wherein the first supplier information identifies other entities that supply first products or services comprising products or services other than computer products or services to the first entity, and wherein the first supplier weightings identify different weightings depending upon an importance to the first entity of the first products or services comprising products or services other than computer products or services that are supplied by the other entities to the first entity;
receiving, at the computer system over the computer network, a network transmission comprising second software patch management information for computer systems of a second entity from the second entity,
wherein the second entity comprises a second commercial enterprise or government organization distinct from the first commercial enterprise or government organization of the first entity;
receiving, at the computer system over the computer network, a network transmission comprising second supplier information and second supplier weightings from the second entity, wherein the second supplier information identifies other entities that supply second products or services comprising products or services other than computer products or services to the second entity, and wherein the second supplier weightings identify different weightings depending upon an importance to the second entity of the products or services comprising products or services other than computer products or services that are supplied by the other entities to the second entity;
associating, by the computer system, the first entity with a supply chain based upon the first supplier information and the second supplier information, wherein the supply chain comprises a multi-level web of nested members that are linked in producer-supplier relationships for the first products or services comprising products or services other than computer products or services,
wherein the second entity is a supplier of the first entity included in the first supplier information and a member of the multi-level web of nested members;
calculating, by the computer system, a first metric of cyber preparedness for the first entity in the supply chain that comprises the multi-level web of nested members that are linked in producer-supplier relationships for the first products and services comprising products or services other than computer products or services, based upon the first software patch management information, the first supplier information, the first supplier weightings, and the second software patch management information;
calculating, by the computer system, a second metric of cyber preparedness for the second entity based on the second supplier information, the second supplier weightings, and the second software patch management information; and
transmitting, over the computer network, a network transmission comprising the first metric of cyber preparedness to the first entity within the supply chain,
wherein the transmitting comprises transmitting a graphic illustration of the multi-level web of nested members that are linked in producer-supplier relationships of the supply chain for the first products or services comprising products or services other than computer products or services, to the first entity as a member of the supply chain, along with a calculation of cyber preparedness of the other entities in the multi-level web of nested members that are linked in producer-supplier relationships of the supply chain, and
wherein the calculation of cyber preparedness of the other entities comprises the second metric of cyber preparedness.

2. The method according to claim 1 further comprising normalizing the first software patch management information and/or the second software patch management information that was received.

3. The method according to claim 1 further comprising receiving a software patch management weighting from the second entity of the supply chain and wherein calculating the first metric of cyber preparedness for the first entity in the supply chain based upon the first software patch management information, the first supplier information, the first supplier weightings, and the second software patch management information comprises calculating the first metric of cyber preparedness for the first entity in the supply chain based upon the first software patch management information, the first supplier information, the first supplier weightings, the second software patch management information, and the software patch management weighting.

4. The method according to claim 1 wherein the first software patch management information comprises a software patch-related key performance indicator.

5. The method according to claim 4 wherein calculating the first metric of cyber preparedness for the first entity in the supply chain based upon the first software patch management information, the first supplier information, the first supplier weightings, and the second software patch management information comprises identifying a deviation from a nominal value of the software patch-related key performance indicator.

6. The method according to claim 1 wherein transmitting the first metric of cyber preparedness to the first entity within of the supply chain further comprises transmitting a warning to the first entity within the supply chain to indicate a lapse of cyber preparedness of an entity in the supply chain.

7. The method according to claim 1 wherein the multi-level web of nested members that are linked in producer-supplier relationships comprises at least four levels.

8. The method according to claim 7, wherein a first level of the multi-level web of nested members that are linked in producer-supplier relationships comprises the second entity supplying a product or service of the first products or services comprising products or services other than computer products or services to the first entity, wherein a second level of the multi-level web of nested members that are linked in producer-supplier relationships comprises a third entity supplying a product or service of the second products or services comprising products or services other than computer products or services to the second entity, wherein a third level of the multi-level web of nested members that are linked in producer-supplier relationships comprises a fourth entity supplying a product or service of third products or services comprising products or services other than computer products or services to the third entity, and wherein a fourth level of the multi-level web of nested members that are linked in producer-supplier relationships comprises a fifth entity supplying a product or service of fourth products or services comprising products or services other than computer products or services to the fifth entity.

9. A cyber auditor hub comprising:

a processor; and a memory coupled to the processor and comprising computer readable program code embodied in the memory that when executed by the processor causes the processor to perform operations comprising:

receiving, over a computer network, a network transmission comprising first software patch management information for computer systems of a first entity from the first entity, wherein the first entity comprises a first commercial enterprise or government organization;

receiving, over the computer network, a network transmission comprising first supplier information and first supplier weightings from the first entity, wherein the first supplier information identifies other entities that supply first products or services comprising products or services other than computer products or services to the first entity, and wherein the first supplier weightings identify different weightings depending upon an importance to the first entity of the first products or services comprising products or services other than computer products or services that are supplied by the other entities to the first entity;

receiving, over the computer network, a network transmission comprising second software patch management information for computer systems of a second entity from the second entity, wherein the second entity comprises a second commercial enterprise or government organization distinct from the first commercial enterprise or government organization of the first entity;

receiving, over the computer network, a network transmission comprising second supplier information and second supplier weightings from the second entity, wherein the second supplier information identifies other entities that supply second products or services comprising products or services other than computer products or services to the second entity, and wherein the second supplier weightings identify different weightings depending upon an importance to the second entity of the products or services comprising products or services other than computer products or services that are supplied by the other entities to the second entity;

associating the first entity with a supply chain based upon the first supplier information and the second supplier information, wherein the supply chain comprises a multi-level web of nested members that are linked in producer-supplier relationships for the first products or services comprising products or services other than computer products or services, wherein the second entity is a supplier of the first entity included in the first supplier information and a member of the multi-level web of nested members;

calculating a first metric of cyber preparedness for the first entity in the supply chain that comprises the multi-level web of nested members that are linked in producer-supplier relationships for the first products and services comprising products or services other than computer products or services, based upon the first software patch management information, the first supplier information, the first supplier weightings, and the second software patch management information;

calculating, by the computer system, a second metric of cyber preparedness for the second entity based on the second supplier information, the second supplier weightings, and the second software patch management information; and transmitting, over the computer network, a network transmission comprising the first metric of cyber preparedness to the first entity within the supply chain, wherein the transmitting comprises transmitting a graphic illustration of the multi-level web of nested members that are linked in producer-supplier relationships of the supply chain for the first products or services comprising products or services other than computer products or services, to the first entity as a member of the supply chain, along with a calculation of cyber preparedness of the other entities in the multi-level web of nested members that are linked in producer-supplier relationships of the supply chain, and wherein the calculation of cyber preparedness of the other entities comprises the second metric of cyber preparedness.

10. The cyber auditor hub according to claim 9 wherein receiving the first software patch management information from the first entity comprises normalizing the first software patch management information.

11. The cyber auditor hub according to claim 9 further comprising receiving a software patch management weighting from the second entity of the supply chain and wherein calculating the first metric of cyber preparedness for the first entity in the supply chain based upon the first software patch management information, the first supplier information, the first supplier weightings, and the second software patch management information comprises calculating the first metric of cyber preparedness for the first entity in the supply chain based upon the first software patch management information, the first supplier information, the first supplier weightings, the second software patch management information, and the software patch management weighting.

12. The cyber auditor hub according to claim 9 wherein the first software patch management information comprises a software patch-related key performance indicator.

13. The cyber auditor hub according to claim 12 wherein calculating the first metric of cyber preparedness for the first entity in the supply chain based upon first the software patch management information, the first supplier information, the first supplier weightings, and the second software patch management information comprises identifying a deviation from a nominal value of the software patch-related key performance indicator.

14. The cyber auditor hub according to claim 9 wherein transmitting the first metric of cyber preparedness to the first entity within the supply chain further comprises transmitting a warning to the first entity within the supply chain to indicate a lapse of cyber preparedness of an entity in the supply chain.

15. The cyber auditor hub according to claim 9 wherein the multi-level web of nested members that are linked in producer-supplier relationships comprises at least four levels.

16. The cyber auditor hub according to claim 15 wherein a first level of the multi-level web of nested members that are linked in producer-supplier relationships comprises the second entity supplying a product or service of the first products or services comprising products or services other than computer products or services to the first entity,
- wherein a second level of the multi-level web of nested members that are linked in producer-supplier relationships comprises a third entity supplying a product or service of the second products or services comprising products or services other than computer products or services to the second entity,
- wherein a third level of the multi-level web of nested members that are linked in producer-supplier relationships comprises a fourth entity supplying a product or service of third products or services comprising products or services other than computer products or services to the third entity, and
- wherein a fourth level of the multi-level web of nested members that are linked in producer-supplier relationships comprises a fifth entity supplying a product or service of fourth products or services comprising products or services other than computer products or services to the fifth entity.

17. A computer program product, comprising:
a tangible non-transitory computer readable storage medium comprising computer readable program code embodied in the medium that when executed by at least one processor of a computer system causes the at least one processor to perform operations comprising:
receiving, at the computer system over a computer network, a network transmission comprising first software patch management information for computer systems of a first entity from the first entity, wherein the first entity comprises a first commercial enterprise or government organization;
receiving, over the computer network at the computer system, a network transmission comprising first supplier information and first supplier weightings from the first entity, wherein the first supplier information identifies other entities that supply first products or services comprising products or services other than computer products or services to the first entity, and wherein the first supplier weightings identify different weightings depending upon an importance to the first entity of the first products or services comprising products or services other than computer products or services that are supplied by the other entities to the first entity;
receiving, at the computer system over the computer network, a network transmission comprising second software patch management information for computer systems of a second entity from the second entity,
wherein the second entity comprises a second commercial enterprise or government organization distinct from the first commercial enterprise or government organization of the first entity;
receiving, at the computer system over the computer network, a network transmission comprising second supplier information and second supplier weightings from the second entity, wherein the second supplier information identifies other entities that supply second products or services comprising products or services other than computer products or services to the second entity, and wherein the second supplier weightings identify different weightings depending upon an importance to the second entity of the products or services comprising products or services other than computer products or services that are supplied by the other entities to the second entity;
associating, by the processor, the first entity with a supply chain based upon the first supplier information and the second supplier information, wherein the supply chain comprises a multi-level web of nested members that are linked in producer-supplier relationships for the first products or services comprising products or services other than computer products or services,
- wherein the second entity is a supplier of the first entity included in the first supplier information and a member of the multi-level web of nested members;
calculating, by the processor, a first metric of cyber preparedness for the first entity in the supply chain that comprises the multi-level web of nested members that are linked in producer-supplier relationships for the first products and services comprising products or services other than computer products or services, based upon the first software patch management information, the first supplier information, the first supplier weightings, and the second software patch management information;
calculating, by the processor, a second metric of cyber preparedness for the second entity based on the second supplier information, the second supplier weightings, and the second software patch management information; and
transmitting, over the computer network, a network transmission comprising the first metric of cyber preparedness the first entity within the supply chain,
wherein the transmitting comprises transmitting a graphic illustration of the multi-level web of nested members that are linked in producer-supplier relationships of the supply chain for the first products or services comprising products or services other than computer products or services, to the first entity as a member of the supply chain, along with a calculation of cyber preparedness of the other entities in the multi-level web of nested members that are linked in producer-supplier relationships of the supply chain, and
wherein the calculation of cyber preparedness of the other entities comprises the second metric of cyber preparedness.

18. The computer program product according to claim 17 wherein the first software patch management information comprises a software patch-related key performance indicator.

19. The computer program product according to claim 17 wherein the first metric of cyber preparedness for the first entity in the supply chain comprises a deviation from a nominal value of a software patch-related key performance indicator.

20. The computer program product according to claim 17 wherein the multi-level web of nested members that are linked in producer-supplier relationships comprises at least four levels.

21. The computer program product according to claim 20 wherein a first level of the multi-level web of nested members that are linked in producer-supplier relationships comprises the second entity supplying a product or service of the first products or services comprising products or services other than computer products or services to the first entity, wherein a second level of the multi-level web of nested members that are linked in producer-supplier relationships comprises a third entity supplying a product or service of the second products or services comprising products or services other than computer products or services to the second entity, wherein a third level of the multi-level web of nested members that are linked in producer-supplier relationships comprises a fourth entity supplying a product or service of third products or services comprising products or services other than computer products or services to the third entity, and wherein a fourth level of the multi-level web of nested members that are linked in producer-supplier relationships comprises a fifth entity supplying a product or service of fourth products or services comprising products or services other than computer products or services to the fifth entity.

\* \* \* \* \*